United States Patent

Parks

[15] 3,687,431
[45] Aug. 29, 1972

[54] PREHEATING OF DRY AGGREGATE FOR CARBON ELECTRODES

[72] Inventor: Keith W. Parks, Oakmont, Pa.
[73] Assignee: Aluminum Company of America, Pittsburgh, Pa.
[22] Filed: Dec. 18, 1970
[21] Appl. No.: 99,617

[52] U.S. Cl. ..........................................263/52, 34/10
[51] Int. Cl. ...........................F27b 15/00, F26b 3/08
[58] Field of Search...................263/21 A, 52; 34/10

[56] References Cited

UNITED STATES PATENTS 2,582,710   1/1952   Martin........................34/10 X
2,525,790   10/1950  Garbo.......................263/21 A

*Primary Examiner*—John J. Camby
*Attorney*—Elroy Strickland

[57] ABSTRACT

A process for heating aggregate particles of calcined coke for mixing with a carbonaceous binder such as pitch. The process comprises the steps of directing the particles to a bed thereof fluidized by a gaseous stream, heating the particles with a source of radiant heat disposed directly in the path of the fluidizing stream, preferably directly in the bed itself, and removing the heated particles from the bed for immediate mixing with the carbonaceous binder.

4 Claims, 1 Drawing Figure

Patented Aug. 29, 1972
3,687,431
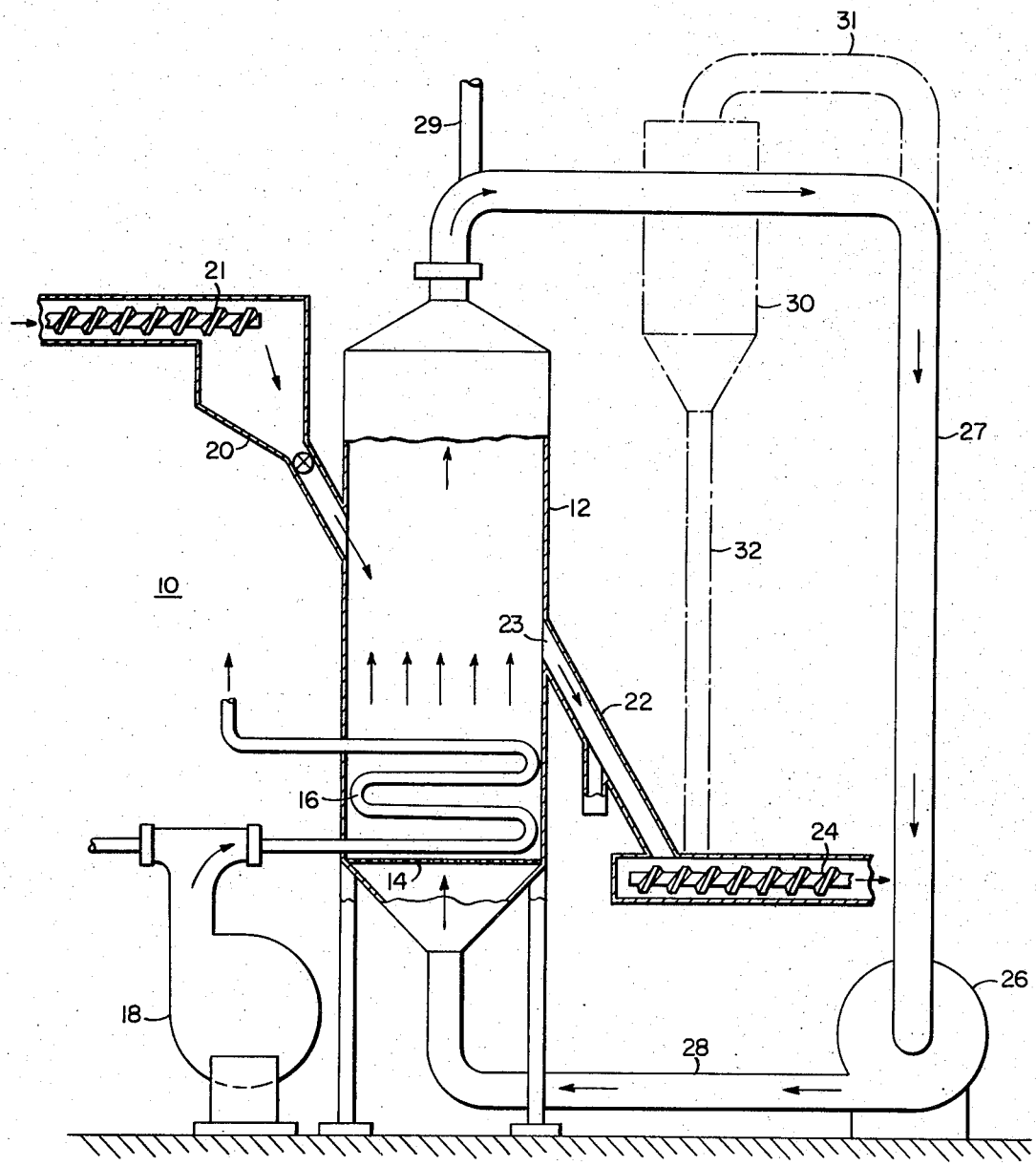
INVENTOR
Keith W. Parks
BY
E. Strickland
ATTORNEY

PREHEATING OF DRY AGGREGATE FOR CARBON ELECTRODES

BACKGROUND OF THE INVENTION

The present invention relates generally to carbon block electrodes for use in electrolytic cells employed in the production of molten metal from a compound of the metal, and particularly to a method of preheating calcined coke used in making such electrodes.

In making carbon electrodes for electrolytic cells, a dry aggregate of sized carbon or graphite particles is mixed with a carbonaceous binder such as pitch, the mixture being disposed in a mould providing the desired block configuration for the electrode. The thus moulded block is then baked to form a hard, heat resistant structure.

To enhance the mixing process, i.e. to achieve a more homogeneous mix of the aggregate and pitch and to reduce the mixing time, heating the dry aggregate prior to mixing with the pitch has been practiced in a variety of ways in the carbon block manufacturing industry. The most common method involves the process of conveying the aggregate by means of a slow moving screw through a heated chamber before the coke is mixed with the pitch. The movement of the screw conveyor is slow because of a dusting problem, a certain proportion of the coke aggregate being finely divided particulate matter. The rate of heat transfer from the screw conveyor to the aggregate has proven to be quite slow, and the capital investment per pound of aggregate heated is unduly high.

Another aggregate preheating practice in the industry has been the use of a directly fired, fluidized bed of the aggregate, the bed being fired (and thereby heated) by the products of combustion within the bed. Heat transfer rates are substantially greater for such a process in comparison to the screw conveyor, but a continuous addition of new combustion products is required which requires a corresponding continuous withdrawal of a like volume of gas and/or particulate matter from the system. This withdrawal volume includes a high dust load that must be removed and returned to the process before the gas is released to the atmosphere in order to avoid a complete loss of the dust, and to prevent substantial contamination of the atmosphere with the dust.

A third method of heating coke aggregate has been the use of a direct-fired rotating drum heater containing tubes for conveying the aggregate through the drum. Combustion products move freely within the drum and about the tubes to contact the same and thereby heat the aggregate. Sealing has been a problem with such drums so that it is difficult to maintain separation of the coke aggregate and combustion products. Further, the hot combustion gases are removed from the drum without further use so that the efficiency of this method is low. For these reasons, this method of heating aggregate has not gained wide spread acceptance.

BRIEF SUMMARY OF THE INVENTION

The present invention is directed to a process of preheating calcined coke aggregate in which a gaseous medium, employed to fluidize a bed of the coke, is recirculated through a closed-loop arrangement past a heated surface or surfaces located directly in the bed or in the flow path of the fluidizing medium but fired or energized by means located separately from the bed and fluidizing medium. In this manner, high heat transfer rates are effected between the heated surfaces and aggregate without the necessity of having actual combustion in the bed, and without the requirement of withdrawing a portion of the fluidizing medium from the system commensurate with that portion of combustion products supplied to the system. Any dust entrained in the fluidizing medium is returned to the bed by the closed-loop arrangement. The aggregate in the bed is thus heated by heating the gaseous medium moving past the heated surfaces, by heat radiated from the heated surfaces, by convection currents, by physical contact of any particulate matter entrained in the gaseous stream moving past the heated surfaces, and by direct contact between the heated surfaces and the aggregate if the heated surfaces are physically located within the bed.

It has also been found, that the structures and apparatus required for the present invention require an investment per unit of aggregate heated substantially below that of the screw conveyors presently and extensively used in the coke heating industry.

THE DRAWING

The invention, along with its objectives and advantages, will be best understood from consideration of the following detailed description and the accompanying drawing in which the sole FIGURE shows schematically an arrangement for heating calcined coke aggregate in accordance with the principles of the present invention.

PREFERRED EMBODIMENT

Referring now to the drawing, the single FIGURE shows schematically an arrangement 10 in which an aggregate of dry calcined coke is heated in accordance with the process of the present invention. More specifically, the arrangement comprises a heating vessel and housing 12 containing a perforated plate structure 14 extending across the width thereof, and heated surfaces in the form of fired tubes 16, for example, located above the plate. The tubes are connected in fluid communication with a firing unit 18 located externally of the heating vessel and housing. The tubes are represented schematically in the drawing by a serpentine line. The actual construction of the tube or tubes may embody any suitable configuration providing a maximum surface area for exchanging heat with coke aggregate as explained hereinafter.

The firing unit 18 may be any device capable of directing heat energy to and through the length of the tubes 16, for example, a gas fired burner with a suitable blower, though other heat energy sources may be used. If, for example, electrical resistance elements are used in place of the fired tubes, the firing unit 18 would, of course, not be needed.

Connected to the housing 12 at a location above the heating tubes 16, is a chute or conduit 20 connected to a conveyor 21 suitable for feeding an aggregate of dry calcined coke particles to the housing. An output chute or conduit 22 is similarly connected to the housing at an opening 23 therein located above the tubes at a location opposed to the conduit 20 for removing heated aggregate from the housing, the output conduit being connected to a suitable conveyor 24.

The heating vessel 12 is a part of a closed-loop system which includes a blower 26, a conduit 27 connecting the input of the blower to the top of the housing 12, and a conduit 28 connecting the output of the blower to the bottom of the vessel.

For purposes of mixing of the coke aggregate with a carbonaceous binder such as pitch after the aggregate is heated in the housing 12, the sizes of the particles of the aggregate conveyed to the housing via the conveyor 21 are preferably on the order of 1 inch (in cross-section) to dust particle size. As the aggregate enters the vessel or housing, it falls on the perforated plate 14 to form a bed of the aggregate around the heating tubes 16. The aggregate bed is fluidized on the plate and around the tubes by a moving stream of a gaseous medium, such as air, directed up and through the perforations in the plate by the blower 26. The fluidized bed of the aggregate is heated by the heat of combustion within the tubes. This is accomplished by the aggregate physically contacting the tube surfaces, and by the fluidizing medium moving up and through the bed, the medium being heated as it moves past the tube surfaces. In addition, as explained earlier, the heated tubes radiate heat energy to the aggregate within the bed, and heat convection currents will further serve to convey the heat from the tubes to the aggregate within the bed.

From the bed and tubes, the gas moves toward the top of the housing 12 because of a reduction in pressure provided by the blower 26. The gas is conducted from the top of the housing, via conduit 27, and returned to the bottom thereof by the blower and the conduit 28.

With a full bed of fluidized aggregate on the perforated plate 14, as the aggregate is conducted to the housing 12 by the conduit 20 the fluidized bed overflows through the opening 23 in the housing into the conduit 22. The height of the opening 23 above the plate is such that a suitable depth of aggregate is maintained in the bed for heating purposes.

From the conduit 22, the heated aggregate is removed by the conveyor 24 for immediate use. The conveyor 24, for example, may empty into a suitable mixing apparatus where the heated aggregate enhances substantially a mixing process, such as the process of mixing the aggregate with pitch.

In the fluidized bed (as maintained on the perforated plate 14), the aggregate is heated preferably to a temperature of approximately 170° Centigrade so that upon leaving the bed for conduction to a mixing process, the temperature of the aggregate will not be substantially below this temperature, a preferable mixing temperature being on the order of 160° Centigrade. Since the coke aggregate is calcined, i.e., the volatile, combustible products thereof having been driven off in a previous calcining process, the coke aggregate is not combustible in the process of the present invention particularly at temperatures suitable for enhancing the process of mixing pitch and coke aggregate.

As can be appreciated, the surfaces of the heating tubes 16 being located directly in the bed and in the path of the fluidizing medium provide an effective and efficient heat transfer mechanism for heating the components of the bed, i. e. the fluidizing medium and the coke aggregate, without requiring removal of a portion of the medium from the system because of a like portion of combustible product being fed to the system. (The combustible product in the burner 18 is discharged from a remote end of the tube or tubes as indicated in the drawing). Since a portion of fluidizing medium need not be withdrawn, no process and apparatus is required for removing and returning any entrained dust to the system, the closed-loop of the present invention solving the dust return problem while simultaneously providing the means for reheating the fluidizing medium cooled in the process of heating the aggregate. Further, the dust entrained in the fluidizing medium is heated as it passes and/or contacts the heating tubes 16.

In order to admit air into the system for the fluidizing medium circulating in the system, a relatively small opening and pipe 29 is provided in the top of the housing 12. The opening and pipe function to bleed air from the system as air enters the system, for example, through the conveyor 21 with the aggregate conveyed therethrough.

If the dust load in the circulating stream increases to an amount sufficient to collapse the stream, a suitable dust collector 30, a cyclone separator for example, can be added in the conduit 27 as indicated in dash outline in the drawing. The gaseous stream leaving the collector 30 is then simply reunited to the conduit 27 via a conduit 31, and the collected dust is fed to the conveyor 24 via conduit 32 for removal with the heated aggregate.

Though the heating tubes 16, as described above and as shown in the drawing, are preferably located within the fluidized bed (i.e., above the perforated plate 14), the tubes may be located between the bed and the blower 26 (i.e., at a location upstream from the plate 14). In such a case, the fluidizing medium would be heated by the tubes on its way to the bed, and the medium would heat the aggregate of the bed as the medium passes therethrough. In addition, heating tubes could be located both in and upstream of the fluidized bed.

From the foregoing description, it should now be apparent that a highly efficient and economical process has been disclosed for heating calcined coke aggregate before it is mixed with a carbonaceous binder. This is accomplished with a heat source located directly in a fluidized bed of the aggregate, and/or directly in the fluidizing stream thereof, the heat source being separately fired or energized so that the products combustion do not enter the bed and fluidizing stream, and the fluidizing stream being continuously recirculated in a closed-loop system.

While the invention has been described in terms of preferred embodiments, the claims appended hereto are intended to encompass all embodiments which fall within the spirit of the invention.

Having thus described my invention and certain embodiments thereof, I claim:

1. In a process of making carbon electrodes from a mixture of calcined coke particles and a carbonaceous binder, the process comprising the steps of
supplying the coke particles to a fluidized bed of the particles located within a heating vessel, said bed being fluidized by a gaseous medium directed upwardly through said bed and vessel, and recirculated thereto through a closed-loop arrangement connecting the vessel on opposed sides of said fluidized bed in fluid communication, the particles and fluidizing medium comprising the components of said bed, heating the particles by contacting at least one of the components of said bed with a heated surface, removing the heated particles from said bed, for mixing with a carbonaceous binder material.

2. The process of claim 1 including the step of supplying heat to the heated surface from a source of heat energy located separately from the heating vessel and closed-loop arrangement.

3. A process for preheating particles of calcined coke to be used in the manufacture of carbon electrodes, said process comprising the steps of directing said particles to a fluidized bed thereof within a housing structure, said bed being fluidized by a gaseous medium directed upwardly through said bed and housing structure, and recirculated thereto through a closed-loop arrangement connecting the housing structure on opposed sides of said fluidized bed in fluid communication, the components of said bed comprising said particles and said fluidizing medium, heating said particles by contacting at least one of the components of said bed with a heated surface, and removing the heated particles from said bed for mixing with a carbonaceous binder material.

4. The process of claim 3 including the step of supplying heat to the heated surface from a source of heat energy located separately from the housing structure and closed-loop arrangement.

* * * * *